INVENTOR.
Otokar Chládek
BY Richard ...

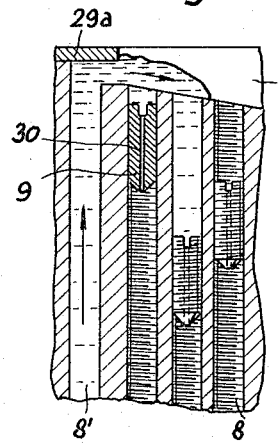
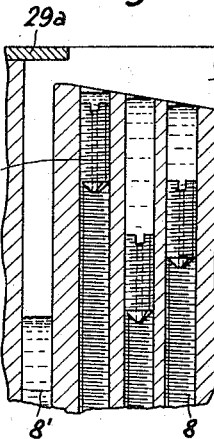
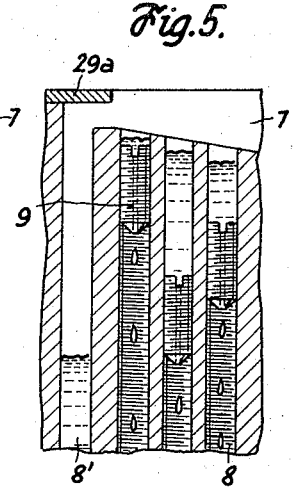
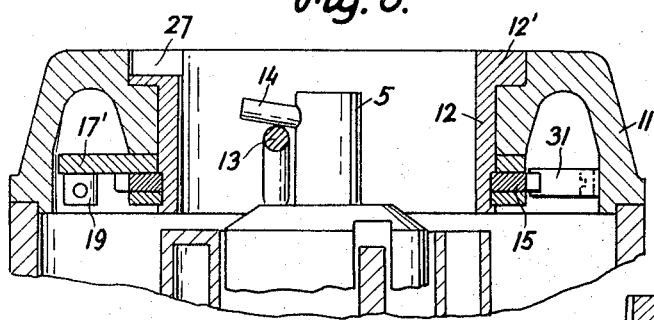
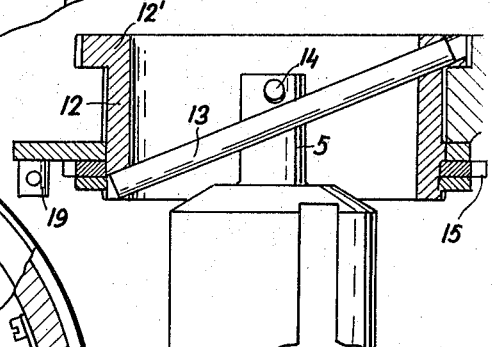
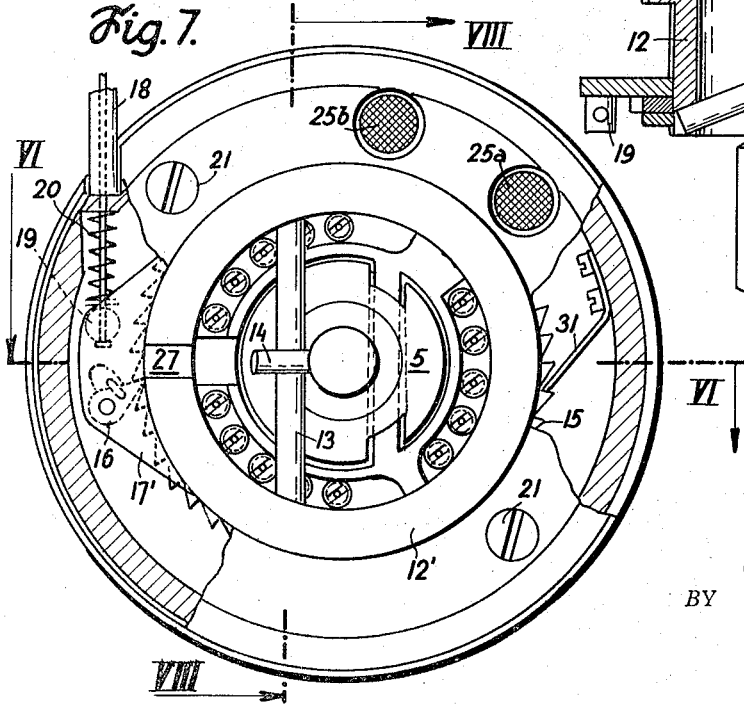

United States Patent Office 3,306,496
Patented Feb. 28, 1967

3,306,496
LUBRICANT DISPENSING DEVICE
Otokar Chládek, Vladislav, Czechoslovakia, assignor to Elitex, Zavody textilniho strojirenstvi, Libered, Czechoslovakia
Filed Dec. 20, 1965, Ser. No. 515,077
Claims priority, application Czechoslovakia, Dec. 21, 1964, 7,207/64
10 Claims. (Cl. 222—137)

This invention relates to lubricant dispensing devices, and particularly to a device for dispensing one or more lubricants by gravity to a multiplicity of bearings and other pairs of movably engaged machine parts.

Lubricant dispensing devices of the type with which this invention is concerned are of particular importance to knitting machines and other textile machinery, but other applications will readily suggest themselves. Knitting machines have a multiplicity of bearings and other frictionally engaged elements which require lubrication. Lubrication is required at different rates by different groups of elements, and some of these elements require different grades of lubricant than others.

The primary object of the invention is the provision of a single central lubricant dispensing device which meters one or several kinds of lubricant to a multiplicity of lubrication points at precisely adjustable different rates.

Another object is the provision of such a dispensing device which provides lubricant at a rate commensurate with the operating time of the lubricated apparatus.

A further object is the provision of a lubricant dispensing device which has a minimum of moving parts, and whose moving parts need not have critically precise dimensions.

With these and other objects in view, the invention in one of its aspects provides a storage container and a pumping compartment which communicate with each other through a restricted duct arranged below the normal liquid lubricant level in the storage container when the device is in its normal operative position. Terms such as "vertical" and "horizontal" will be employed hereinafter with reference to such a normal position of the device for the sake of clarity and convenience of description, and will be understood not necessarily to designate specific spatial relationships relative to the field of terrestrial gravity.

A plunger is received in the pumping compartment and extends at least partly in the bottom portion of the compartment below the afore-mentioned liquid level. It may be moved inward and outward of that compartment portion. One end of a discharge conduit of much smaller horizontal cross section that the cross section of the plunger transversely of its direction of movement is connected with the bottom portion of the compartment whereas its other end portion is well above the normal liquid level and communicates with a distribution conduit which extends horizontally but also slopes downwardly away from the discharge conduit.

Several dosing vessels communicate with the distribution conduit in such a manner that liquid lubricant discharged from the discharge conduit into the distribution conduit flows by gravity from the discharge conduit through the distribution conduit into the several dosing vessels. Means are provided for separately discharging each dosing vessel.

The exact nature of this invention as well as other features and advantages thereof will be readily apparent from consideration of the following specification relating to the annexed drawing in which.

FIGS. 3, 4, and 5 show a portion of the same device in a developed elevational view and in sequential operative conditions;

FIG. 6 shows the device in fragmentary elevational section on the line VI—VI in FIG. 7;

FIG. 7 is a top plan view of the device without its cap; and

FIG. 8 is another elevational sectional view taken on the line VIII—VIII in FIG. 7.

Figure 1:
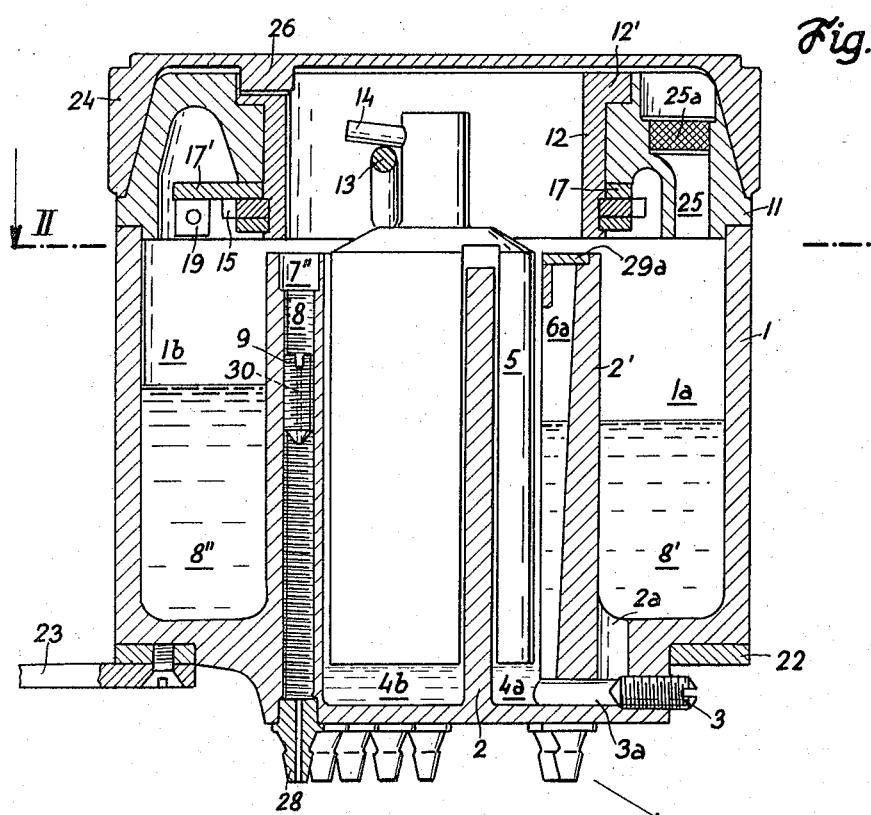
FIG. 1 shows a preferred embodiment of the invention in elevational section on the line I—I in FIG. 2.

Referring now to the drawing in detail, and initially to FIG. 1, there is seen a lubricant dispensing device of the invention which has an outer, substantially cylindrical casing. The lower main portion 1 of the casing is a cup-shaped metal casting whose internal cavity is subdivided by integral partitions into several upwardly open spaces. A cylindrically tubular partition wall 2' coaxial with the casing portion 1' and respective radial parts of a partition wall 2 form two storage vessels 1a, 1b. Another flat part of the wall 2 divides the central space within the wall 2' into two compartments 4a, 4b hereinafter referred to as "pumping compartments." The circumferential dimensions of the vessel 1b and of the compartment 4b are approximately twice the corresponding dimensions of the vessel 1a and of the compartment 4a.

An axial outlet opening 2a in the bottom of the vessel 1a communicates with a horizontal duct 3a in the casing portion 1 which leads into the lowermost portion of the pumping compartment 4a. The wall of the duct is threaded over a portion of its length and threadedly receives a plug 3. One end of the plug 3 projects from the casing portion 1 and is slotted for engagement by a screw driver. When the plug 3 is turned, it moves toward and away from the orifice of the outlet opening 2a in the duct 3a, and thus constitutes an adjustable throttle valve for controlling liquid flow through the duct. As is better seen in FIG. 2, an outlet opening 2b in the vessel 1b similarly connects the vessel with a duct 3b and the pumping compartment 4b, and is provided with a throttle valve arrangement mainly consisting of a plug 3.

A plunger 5 of cylindrical overall shape over most of its length is slotted in a plane parallel to its axis. The cylindrical face of the plunger 5 has a diameter similar to, but somewhat smaller than that of the partition wall 2', and the slot in the plunger is dimensioned to receive the aforementioned flat portion of the partition wall 2 with ample clearance. The plunger thus has two integral portions which are axially freely movable in the two pumping compartments 4a, 4b respectively.

Two axial discharge conduits 6a, 6b are formed in the partition wall 2' and their bottom ends are freely open to the pumping compartments 4a, 4b respectively. The conduits may also be horizontally open toward the associated pumping compartments for greater convenience in forming the conduits, as is evident from FIG. 1, but the horizontally open side of each conduit is substantially obstructed by the plunger 5.

The upper horizontal rim of the partition wall 2' is formed with an upwardly open distribution channel. A channel portion 7 extends in a circular arc between the vessel 1a and the pumping compartment 4a. The top end of the discharge conduit 6a terminates in the bottom of the trough-shaped channel portion 7 which is provided with a splash-shield or baffle 29a above the orifice of the discharge conduit. As best seen in FIGS. 3 to 5, which partly show the portion of the partition wall 2 associated with the channel portion 7 in a developed sectionally elevational view, the channel portion 7 slopes obliquely downward from the top end of the discharge conduit 6a to a spout 10 above the vessel 1a.

Four parallel vertical bores 8 are circumferentially spaced in the portion off the partition wall 2 carrying the channel portion 7, only three bores being visible in FIGS. 3 to 5. The upper orifices of the bores 8 are located in the bottom wall of the channel portion 7. Each bore 8 is internally threaded over its entire length, and threadedly receives a plug 9 whose top is slotted for engagement by a screw driver, and which has an axial narrow or capillary bore 30 therethrough. The plugs are readily adjusted to define a precise volume in the associated bore 8 between the plug 9 and the orifice of the bore in the channel portion 7. As will readily become apparent, these bore portions serve as lubricant dosing vessels. The bottom end of each bore 8 carries a hose nipple 28 for connection to a machine part which is to be lubricated.

Figure 2:
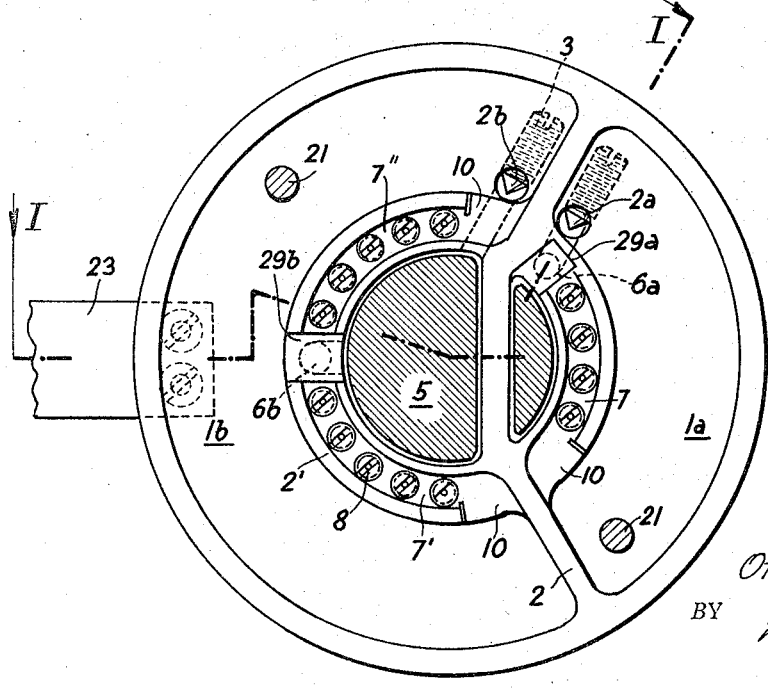
FIG. 2 shows the device of FIG. 1 in plan section on the line II—II.

The discharge conduit 6b rises approximately in the center of the arcuate portion of the partition wall 2' which separates the storage vessel 1b from the pumping compartment 4b. Its top orifice is provided with a vertically spaced splash shield or baffle 29b. Respective distribution channel portions 7' and 7" slope downward and respectively counterclockwise and clockwise away from the top orifice of the conduit 6b to two spouts 10 which lead into the storage vessel 1b, as best seen in FIG. 2. Five dosing vessels 8 have their top orifices in each of the channel portions 7', 7" and are otherwise substantially identical with the aforedescribed arangement associated with the discharge conduit 6a.

A supporting ring 22 is attached to the bottom of the casing portion 1, and is itself carried by a bracket 23, only partly shown in the drawing, for mounting the device at a suitably elevated location.

An upper annular casing portion 11 is attached to the top of the main portion 1 by long screws 21, as is best seen in FIGS. 2 and 7. Two filling ducts 25 in the casing portion 11, of which only one is seen in FIG. 1, are vertically aligned with the vessels 1a, 1b respectively, and are provided with respective screen plugs 25a, 25b in a conventional manner to retain solid contaminants in the lubricant 8', 8" respectively fed to the vessels through the ducts 25.

A tubular drive member 12 is coaxially rotatable in the annular casing portion 11 and is secured against axial movement by a flange 12' at its top end and a ratchet 15 on its bottom end which respectively engage a corresponding radial surface of the drive member 12 and a ring 17 rotatably mounted on the drive member 12. An integral lug 17' radially projects from the ring 17, as is best seen in FIG. 6.

A pawl 16 pivotally mounted on the lug 17' is urged into engagement with the ratchet 15 by a spring. The inner member of a Bowden cable 18 passes through the annular casing portion 11 and is attached to an apertured stud 19 on the underside of the lug 17'. The outer member of the Bowden cable 18 abuts from the outside against the casing portion 11. A spring 20 interposed between the casing portion 11 and the stud 19 tends to turn the ring 17 counterclockwise, as viewed in FIG. 7. A leaf spring 31 fastened to the casing portion 11 and engaging the ratchet 15 limits such counterclockwise movement to one tooth spacing.

As will be apparent from joint consideration of FIGS. 6, 7, and 8, the two ends of a straight cylindrical pin 13 are fastened to the inner wall of the drive member 12 in such a manner that the pin extends in a plane parallel to the axis of the device, but radially spaced from that axis, the two ends being axially offset. The pin 13 cammingly cooperates with a short pin 14 which obliquely extends from the reduced top portion of the plunger 5 in a radial and axially upward direction.

As shown in FIG. 1, the annular casing portion 11 is normally covered by a freely rotatable cap 24. A projection 26 on the underside of the cap 24 engages a corresponding recess 27 (see FIGS. 6 and 7) in the flange 12' of the drive member 12.

The aforedescribed apparatus operates as follows:

The Bowden cable 18 is connected to a moving part of the machine to be lubricated in such a manner that the lug 17' is turned counterclockwise, as viewed in FIG. 7, at regular intervals related to the operation of the machine by the tension of the cable 18. Whenever the tension on the Bowden cable is relaxed, the lug 17' is returned to its starting position by the spring 20. The pawl 19 therefore rotates the ratchet 15, the drive member 12 and the cap 24 in a clockwise direction.

As the cam pins 13 turns about the axis of the device with the drive member 12, it engages the cam follower pin 14 on the plunger 5 and lifts the plunger from the pumping compartments 4a, 4b. When the pin 14 approaches the upper end of the cam pin 13, the latter slips over the free end of the short pin 14, and the plunger 5 falls back into the compartments 4a, 4b by gravity. When during continued stepwise rotation of the driver member 12 the lower end of the cam pin 12 again engages the cam follower pin 14, a new cycle of vertical plunger movement begins with a slow upward movement.

The position of the plug 3 in the duct 3a is adjusted in such a manner that a common level of liquid lubricant 8' can be maintained in the vessel 1a and the associated pumping compartment 4a during the slow upward stroke of the plunger, but that liquid is displaced by the suddenly descending plunger at a rate much greater than the flow rate available through the throttled duct 3a.

The sudden descent of the plunger 5 in the compartment 4a thus forces lubricant 8' to flow upward in the discharge conduit 6a at relatively high velocity beyond the level in the storage vessel 1a, and into the distribution channel portion 7, splashing of the lubricant being prevented by the shield 29a. The liquid flows through the channel portion 7 over the several orifices of the dosing vessels 8 as shown in FIG. 3, sequentially filling the dosing vessels, the excess lubricant 8' being returned to the storage vessel 1a by the spout 10 so that the condition shown in FIG. 4 is reached in which each vessel 8 is filled with lubricant from the associated plug 9 to the upper orifice of the vessel while the liquid level in the discharge conduit 6a recedes because of reversed flow in the duct 3a. The liquid gradually passes through the capillary bores 30 in the several plugs 9 and drips downward into the hose nipples 28 and the associated feed lines (not shown) which lead the lubricant to the several portions of the machine to be lubricated, while the plunger 5 resumes its slow upward movement.

The plunger 5 similarly causes the several dosing vessels associated with the channel portions 7' and 7" to be filled with oil at intervals synchronized with operation of the machine for providing lubricant 8" to a second group of machine parts requiring a lubricant different from 8'.

The clearance between the plunger 5 and the adjacent partition walls 2, 2' is selected small enough to prevent squirting of lubricant through the gap when the plunger descends, but may still be ample to avoid significant wear of the opposite surfaces of the plunger and of the partition walls. The device thus has a practically unlimited trouble-free life. The only maintenance operation required is a periodic replenishment of lubricant 8', 8".

If during start-up of a machine more lubricant is desired to be dispensed than would normally be supplied during automatic operation, the drive member 12 may be rotated by manually turning the cap 24.

The amount of lubricant dispensed from each dosing vessel 8 during a cycle of plunger movement can readily be adjusted by inserting a screw driver in the vessel and turning the plug 9 therein until the dosing vessel has the desired capacity. Adjustment of the plugs 3 is normally only required when changing between grades of lubricant having very different viscosities.

Obviously more than two storage vessels and associated pumping compartments may be operated by respective fixed portions of the same plunger to dispense precisely metered different amounts of more than two types of lubricants from as many dosing vessels as may be desired and such an extension of these teachings will be obvious to those skilled in the art. Only minor mechanical changes will be involved in moving the two portions of the illustrated plunger relative to each other if so desired.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

I claim:

1. A lubricant dispensing device comprising, in combination:
   (a) a storage container adapted to contain a liquid lubricant to a predetermined level in the normal operative position of the device;
   (b) a pumping compartment;
   (c) a restricted duct connecting respective portions of said container and of said compartment below said level;
   (d) plunger means received in said compartment and at least partly extending below said level;
   (e) actuating means for moving said plunger means inward and outward of said portion of said compartment;
   (f) a discharge conduit having one end portion communicating with said portion of said compartment and another end portion above said level, the horizontal cross section of said conduit being substantially smaller than the cross section of said plunger means transversely of the direction of movement thereof;
   (g) a horizontally extending distribution conduit communicating with said other end portion of said discharge conduit and sloping downwardly away from the latter;
   (h) a plurality of dosing vessels communicating with said distribution conduit for gravity flow of liquid lubricant from said other end portion through said distribution conduit to each of said dosing vessels; and
   (i) discharge means for separately discharging lubricant from each dosing vessel.

2. A device as set forth in claim 1, further comprising an adjustable throttle valve in said duct.

3. A device as set forth in claim 1, wherein said plunger means has a horizontal cross section similar to but smaller than the cross section of said compartment and is moved vertically by said actuating means in said compartment.

4. A device as set forth in claim 1, wherein said distribution conduit is an elongated open channel, one terminal portion of said channel contiguously communicating with said other end portion of the discharge conduit, and the channel sloping longitudinally away from said one terminal portion thereof, said dosing vessels having respective upwardly directed orifices longitudinally offset in said channel.

5. A device as set forth in claim 1, further comprising means for adjusting the effective capacity of each dosing vessel.

6. A device as set forth in claim 1, wherein said dosing vessels are vertically elongated and have respective top portions communicating with respective parts of said distribution conduit at different levels, a longitudinal portion of each dosing vessel being of uniform cross section, said discharge means including a plug longitudinally movable in said portion of each dosing vessel, means for securing said plug in the associated dosing vessel in a plurality of selected longitudinal positions, the plug being formed with a restricted longitudinal bore therethrough, and a lubricant feed conduit communicating with said bore.

7. A device as set forth in claim 1, wherein said actuating means include a rotary drive member, means for rotating said drive member, and cam means interposed between said drive member and said plunger means for moving the plunger means outward of said compartment means at a first speed in response to rotation of said drive member, and for thereafter causing the plunger means to move inward of said compartment portion at a second speed substantially greater than said first speed.

8. A device as set forth in claim 7, wherein said cam means include cooperating lifting means mounted on said drive member and on said plunger means respectively and engaging each other during a part of each revolution of said drive member for lifting said plunger means outwardly of said compartment portion, said lifting means being disengaged during another part of each revolution of said drive member for permitting the plunger means to drop inward of said compartment.

9. A lubricant dispensing device comprising, in combination:
   (a) two storage containers, each container being adapted to contain a liquid lubricant to a predetermined level in the normal operative position of the device;
   (b) two pumping compartments respectively associated with said containers;
   (c) a restricted duct connecting respective portions of each container and of the associated compartment below said level;
   (d) plunger means including two fixedly connected plunger members respectively received in said compartments and at least partly extending below said level in the respective compartment;
   (e) actuating means for jointly moving said plunger members inward and outward of said portions of the associated compartments;
   (f) two discharge conduits respectively associated with said compartments, each discharge conduit having one end portion communicating with said portion of the associated compartment and another end portion above said level, the horizontal cross section of said conduit being substantially smaller than the cross section of the associated plunger member transversely of the direction of movement of the latter;
   (g) two horizontally extending distribution conduits respectively communicating with said other end portions and sloping downwardly away from the associated end portions;
   (h) two groups of dosing vessels respectively associated with said distribution conduits, each group including a plurality of dosing vessels communicating with the associated distribution conduit for gravity flow of liquid lubricant from said other end portion of the corresponding discharge conduit through the distribution conduit to each of said dosing vessels; and
   (i) discharge means for separately discharging lubricant from each dosing vessel.

10. A device as set forth in claim 9, comprising a casing defining a cavity therein and partition means in said cavity, and dividing the same into a plurality of parts, said containers and said compartments constituting parts of said casing and of said partition means.

References Cited by the Examiner

UNITED STATES PATENTS

| | | | |
|---|---|---|---|
| 2,064,742 | 12/1936 | Goldsmith | 222—391 X |
| 2,398,234 | 4/1946 | Long | 222—440 X |
| 2,720,343 | 10/1955 | Ross et al. | 222—420 X |
| 3,007,611 | 11/1961 | Coolidge | 222—137 |
| 3,122,272 | 2/1964 | Marsh | 222—144 X |
| 3,175,732 | 3/1965 | Unger | 222—440 X |
| 3,220,615 | 11/1965 | Spatz | 222—319 X |

RAPHAEL M. LUPO, *Primary Examiner.*